Feb. 18, 1969  B. STEVERDING  3,428,254
COOLED INJECTANT GAS DUCT FOR THRUST VECTOR CONTROL APPARATUS
Filed Oct. 19, 1966

Bernard Steverding,
INVENTOR.

BY

United States Patent Office 3,428,254
Patented Feb. 18, 1969

3,428,254
COOLED INJECTANT GAS DUCT FOR THRUST
VECTOR CONTROL APPARATUS
Bernard Steverding, Guntersville, Ala., assignor to the
United States of America as represented by the Secretary of the Army
Filed Oct. 19, 1966, Ser. No. 588,678
U.S. Cl. 239—127.3                                    10 Claims
Int. Cl. B64d 33/04, 33/08

ABSTRACT OF THE DISCLOSURE

A cooled injectant gas duct for transferring hot gases from the combustion chamber of a rocket motor into the exhaust stream emanating the motor exhaust. The duct combines heat sink for cooling purposes with injection means for cooling the internal surface of the duct. The heat from the combustion gases is conducted to the heat sink to gradually decompose the plastic causing tangential injection of the gaseous decomposition products through the indentations and radially through perforations into the duct. These gaseous decomposition products thus form a protective layer of barrier on the interior wall of the duct.

---

This invention relates to fluid delivery or transfer duct means and is more particularly directed to a cooled injectant gas duct.

The present invention has particular application in missiles and rockets as part of the secondary thrust vector control apparatus wherein the injectant duct, commonly referred to in the art as a "blowpipe," is used for transferring hot gases from the combustion chamber to the secondary injectant device for discharge into the exhaust stream emanating the reaction motor exhaust nozzle.

The most efficient and simple method of thrust deflection or thrust vector control is accomplished by the injection of a gas or liquid stream into the path of the rocket exhaust stream. The injection of such a stream into the divergent section of an exhaust nozzle, for example, creates a compression wave which acts to deflect the flow of the main exhaust stream. Such a method is highly advantageous in larger rockets since it requires little additional power and it is not affected by critical exhaust temperatures in the exhaust nozzle. The present method contemplates injection of the hot combustion gases of the rocket motor into the main rocket nozzle to create the desired thrust deflection. Such a system has the advantage over other known secondary fluid injectant systems in that weight in the form of the injectant is not added to the space vehicle. In this type system, the hot gases are bled directly from the combustion chamber through the injectant gas duct into the exhaust nozzle through a secondary injectant device on the aft portion of the nozzle.

However, this method of vector control is greatly handicapped by the low resistance of present materials of which the injectant duct is normally made to the impingement of hot flame gases flowing therethrough. Certain refractory metals, ablative coatings, etc., have been employed in forming the injectant duct in an effort to withstand the severe thermal environment. However, the melting point of these materials places an undue limitation on the maximum temperature a propellant may reach. Consequently, the use of such materials alone is not practical except on very short-lived hardware.

In addition, advanced high temperature rocket propellants produce thermal environments of sufficient severity to cause increasing problems in the materials of construction used in making the injectant duct. The most suitable approach employs some form of cooling means for the injectant duct. However, numerous problems have been encountered in known cooling arrangements.

Thus, a need presently exists for a hot gas delivery tube or duct which is independent of the aforementioned limitations and problems.

By employment of the present invention, the problems and difficulties of the prior art are substantially overcome, and an injectant duct is provided which is simple and compact in construction and efficient in operation. Additionally, the present invention provides a cooled hot gas transfer duct which is easily formed without requiring intricate molds, tools, etc.

Therefore, it is a principal object of the present invention to provide improved means for cooling delivery tubes or hot gas transfer ducts for reaction motors employed with missiles, rockets and related air and space borne vehicles by combining heat sink cooling methods with injection cooling methods.

Another object of the present invention is to provide means for protecting the internal surface of hot gas transfer ducts of reaction motors from the high temperature of combustion chamber gases flowing therethrough.

A further object of the present invention is to provide structure for minimizing ablation of the transfer duct interior normally caused by the high temperature of the exhaust gases flowing therethrough.

A still further object of the present invention is to provide an improved cooling duct means and method which provides a layer of cooling gases for insulating the interior surface of the transfer duct from the hot gases and minimizing heat transfer thereto.

Another object of the present invention is to provide an injectant duct which will have high thermal shock resistance.

These and other objects, features, and attendant advantages of the present invention will become readily apparent from a careful consideration of the following detailed description when considered in conjunction with the accompanying drawing, in which.

Figure 1:
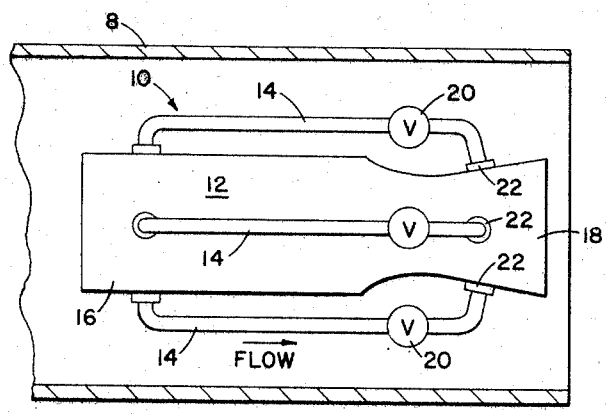
FIGURE 1 is a diagrammatic view of a reaction motor and thrust vector control apparatus embodying the present invention, the aft end of a missile body housing the motor being shown in section.

Referring to the drawing, FIGURE 1, there is shown a conventional thrust vector control apparatus, generally indicated by the numeral 10, for controlling the attitude of a missile or the like vehicle 8 (partially shown) powered by a rocket or the like reaction motor 12. Apparatus 10 includes a blowpipe or hot gas transfer duct 14 which functions as a communicating passageway for the transfer of hot gases, bled from the motor combustion chamber 16, into the motor exhaust nozzle 18 via secondary injection control valve means 20 and injector means 22.

Figure 2:
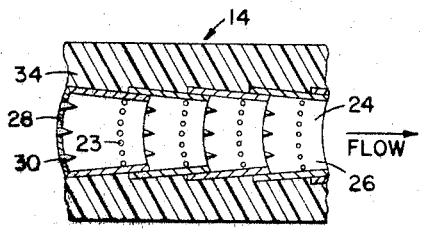
FIGURE 2 is a sectional view of a portion of one of the injectant ducts of FIGURE 1.
Figure 3:
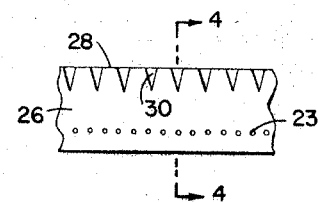
FIGURE 3 is a plan view of a portion of the metallic strip from which the interior portion of the duct of FIGURE 2 is formed.

According to the present invention, an improved hot gas transfer duct 14 is provided and its preferred construction is shown in detail in FIGURE 2. Thus, duct 14 has an inner tubular member 24 positioned interiorly and extending coaxially thereof in concentric relation therewith. Inner tubular member 24 is formed by winding spirally an elongated strip 26 of high heat resistant material, such as tungsten, W-Ta alloys or other refractory metal alloys, on a mandrel (not shown). The preferred method of forming the inner tubular member is accomplished by spirally winding the strip on a mandrel made from a low melting point material, such as "woods metal." Thus, the mandrel can be readily removed by heating the entire duct structure to a temperature sufficient to melt the mandrel, thereby removing the same without affecting the remaining structure. Elongated foil or strip 26 is formed on its upstream, longitudinally extending, running edge 28 with a plurality of indentations 30 (FIGURE 3) preferably tapered in the direction of flow, F (FIGURE 2), so that gases may be injected therethrough in a manner as will be described hereinafter. For additional cooling, the foil or strip may be radially perforated adjacent its opposite edge as shown. As depicted in FIGURE 2, to form the inner tubular member, the running edges of the strip are arranged in overlapping relation, i.e., the upstream edge of one revolution overlaps the downstream edge of the next adjacent revolution. The wound strip or inner tubular member 24 is backed or encased by a relatively thick annulus 34 of fiber reinforced phenolic resins which forms the outer wall of the duct. Thus, annulus 34 may be formed by reinforced plastic filament windings. To increase the heat conductivity of the back-up material, a tungsten or the like powder or fibers are preferably added thereto.

During operation of the thrust vector control apparatus, the hot combustion gases from the combustion chamber are transmitted via duct 14 and secondary injection control means 20 and 22 for injection into the exhaust nozzle. The heat from the hot combustion gases is conducted by the strip material to the plastic heat sink, thereby gradually decomposing the plastic material and thereby causing tangential injection of the gaseous decomposition products through the plurality of indentations 30 and perforations 23 into inner tubular member 24 of the duct. Hence, the injected gaseous decomposition products form a protective layer or barrier on the inside surface or interior wall of the inner, spirally wound tubular member. In addition, charred layers are formed about the external wall of the inner, spirally wound member. By further decomposition of the carbonaceous gases to primitive compounds like $H_2$, $CH_4$, etc., further cooling is provided not only by the endothermal heats of decomposition but also by the increase in heat capacity of the gases.

It should be apparent that the thermal shock resistance of a hot gas injectant duct constructed according to the present invention is very high. Additionally, an outstanding advantage of the invention resides in the fact that the cooled duct, including inner tubular member 24 and back-up material 34, is simple to fabricate without the use of intricate molds, tools, etc., and is readily adapted for use wherein ducts require bends formed therein.

Figure 4:
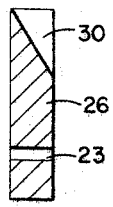
FIGURE 4 is a view taken on line 4—4 of FIGURE 3.
Figure 5:
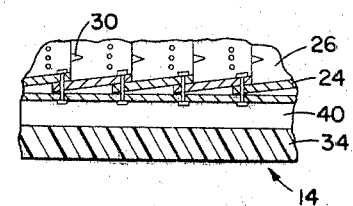
FIGURE 5 is a sectional view similar to that of FIGURE 2 but showing a modified duct structure embodying the invention.

Another embodiment of the present invention is depicted in FIGURE 4. In this embodiment, fins 40 are secured, as by riveting or spot-welding, to the spirally wound strip, thereby increasing the mechanical stability of the inner tubular member. Preferably, the fins are made of tungsten or a tungsten alloy. The fins can be arranged either in the axial direction or in a winding direction opposite to the winding direction of the spiral strip. Thus, the fins are spaced apart circumferentially about the inner tubular member and may be wound spirally in the longitudinal direction, i.e., in an axial direction, about the tubular member. In addition to adding strength to the device, the fins function as heat transfer means. The operation of this embodiment is identical to that of FIGURE 2.

While the description is directed specifically to a cooled fluid transfer duct, it should be apparent that other surfaces, e.g., the surface of a rocket motor case, an exhaust nozzle, a jet vane, etc., may be cooled in accordance with the present invention. Additionally, in some applications of the invention, the back-up material may be encased by a metallic or the like rigid casing.

It is, therefore, to be understood that the invention comprehends various obvious changes in the embodiment herein illustrated, within the scope of the appended claims.

What is claimed is:

1. A cooled hot gas transfer duct adapted for transferring hot gases and the like fluids, comprising: an inner, elongated tubular member forming a passageway for transferring hot gases axially therethrough, an outer, generally tubular-shaped annulus of back-up material formed of fiber-reinforced phenolic resins immediately surrounding and thereby providing rigidity to said inner tubular member; said inner tubular member further having a plurality of tapered indentations and radial openings formed therein so as to provide fluid communication from the exterior to the interior of said inner tubular member, said openings being arranged in spaced relation both axially and circumferentially of said inner tubular member; whereby, during operation, in transferring hot gases through the inner tubular member, the heat from the hot gases decomposes the resins and the gaseous decomposition products are tangentially injected through said openings, thereby forming a protective layer along the interior wall of said inner tubular member.

2. A cooled hot gas transfer duct as defined in claim 1 wherein said annulus further includes tungsten powder added to the resin material to increase the heat conductivity of said back-up material.

3. A cooled hot gas transfer duct as defined in claim 1 wherein the inner tubular member is formed by a spirally wound strip having its longitudinally extending, running edges arranged in overlapping relation, and wherein the openings are elongated indentations formed in the edge of said strip which is upstream as relates to the direction of hot gas flow through the transfer duct.

4. A cooled hot gas transfer duct as defined in claim 3 wherein the strip is provided with a plurality of radially extending perforations adjacent its opposite edge.

5. A cooled hot gas transfer duct as defined in claim 3 wherein the spirally wound strip is made from tungsten.

6. A cooled hot gas transfer duct as defined in claim 1 wherein the inner tubular member is formed by a spirally wound strip having the longitudinal running edges thereof disposed in overlapping relation, a plurality of stabilizing fins disposed within said resin, said fins being disposed about the exterior of said inner tubular member in spaced apart relation and extending in a direction generally longitudinally of the duct member, each of said fins having a base flange, and securement means rigidly securing the overlapping edges of said strip thereto.

7. A cooled hot gas transfer duct as defined in claim 6 wherein the spirally wound strip is made from tungsten and wherein the stabilizing fins are made from tungsten.

8. In combination with a secondary fluid injection type thrust vector control system for a missile or the like vehicle propelled by a reaction motor, said motor having a combustion chamber and having an exhaust nozzle at its aft end, secondary injection means disposed about the divergent portion of the nozzle for injecting hot gases into the nozzle exhaust stream, the improvement residing in a cooled injectant gas duct for transferring hot gases from the combustion chamber to each said secondary injection means, said duct including: an elongated inner tubular member defined by a spirally wound strip of a high heat resistant, ablative material, said tubular member defining an axial passageway and having a plurality of tapered indentations and radial openings formed therein for providing fluid communication between the exterior of said inner tubular member and said axial passageway; a relatively thick annulus surrounding and encasing the exterior of the inner tubular member, said annulus being formed of fiber-reinforced phenolic resin material; whereby, during operation, in transferring hot gases through said axial passageway, the heat from the hot gases decomposes the resinous material adjacent the exterior of said inner tubular member, and the gaseous decomposition products are tangentially injected through said openings, thereby forming a protective layer along the interior wall of said inner tubular member.

9. The combination defined in claim 8 wherein the spirally wound strip has its longitudinally extending, running edges in overlapping relationship and wherein the openings are elongated indentations formed in the edge of said strip which is upstream as relates to the direction of secondary-injection gas flow through the transfer duct.

10. The combustion defined in claim 9 wherein the strip is further provided with a plurality of radially extending perforations inwardly of its opposite edge.

References Cited

UNITED STATES PATENTS

| | | |
|---|---|---|
| 2,785,878 | 9/1968 | Conrad _____ 257—1 |
| 756,140 | 3/1904 | Reid et al. _____ 138—134 |
| 1,829,979 | 11/1931 | Bundy _____ 138—144 X |
| 3,048,972 | 8/1962 | Barlow _____ 239—265.15 |
| 3,073,111 | 1/1963 | Hasbrouck _____ 239—265.15 |
| 3,129,560 | 4/1964 | Prosen _____ 239—127.3 |
| 3,132,478 | 5/1964 | Thielman _____ 239—265.23 |
| 3,135,297 | 6/1964 | Nordberg et al. ____ 138—144 |
| 3,167,909 | 2/1965 | Thielman _____ 239—127.3 |
| 3,194,013 | 7/1965 | Dagneau et al. |
| 3,226,929 | 1/1966 | McKenna _____ 239—265.15 X |

EVERITT W. KIRBY, *Primary Examiner.*

U.S. Cl. X.R.

239—265.15, 265.23; 138—134